United States Patent
Isobe (10) Patent No.: US 10,065,306 B2
(45) Date of Patent: Sep. 4, 2018

(54) TRAVELING ROBOT, MOTION PLANNING METHOD FOR TRAVELING ROBOT, AND STORAGE MEDIUM STORING PROGRAM FOR TRAVELING ROBOT

(71) Applicant: TOYOTA JIDOSHA KABUSHIKI KAISHA, Toyota-shi (JP)

(72) Inventor: Toru Isobe, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 197 days.

(21) Appl. No.: 14/843,523

(22) Filed: Sep. 2, 2015

(65) Prior Publication Data
US 2016/0059408 A1   Mar. 3, 2016

(30) Foreign Application Priority Data

Sep. 2, 2014   (JP) .................................. 2014-177931

(51) Int. Cl.
*B25J 9/02* (2006.01)
*B25J 5/00* (2006.01)
*B25J 9/16* (2006.01)

(52) U.S. Cl.
CPC .............. *B25J 5/007* (2013.01); *B25J 9/162* (2013.01); *G05B 2219/35124* (2013.01); *G05B 2219/40428* (2013.01); *Y10S 901/01* (2013.01); *Y10S 901/02* (2013.01); *Y10S 901/29* (2013.01); *Y10S 901/46* (2013.01)

(58) Field of Classification Search
CPC ... B25J 5/00–5/04; B25J 9/0003; B25J 9/162; B65G 1/0492; G05D 2201/0216
See application file for complete search history.

(56) References Cited

U.S. PATENT DOCUMENTS

2007/0239315 A1* 10/2007 Sato ...................... B25J 9/1612
                                                        700/245
2012/0283872 A1* 11/2012 Hu .......................... B25J 5/007
                                                        700/245

FOREIGN PATENT DOCUMENTS

JP    2006-026828    2/2006
JP    2010-044530    2/2010
(Continued)

OTHER PUBLICATIONS

Dimitry Berenson, et al., "Manipulation Planning on Constraint Manifolds", The Robotics Institute, Carnegie Mellon University, Intel Research Pittsburgh, 2009, 8 pgs.

*Primary Examiner* — Adam R Mott
(74) *Attorney, Agent, or Firm* — Oblon, McClelland, Maier & Neustadt, L.L.P.

(57) ABSTRACT

A traveling robot includes a mobile unit, an arm and an electronic control unit. The electronic control unit is configured to set a target position to which the traveling robot intends to travel. The electronic control unit is configured to calculate a center of gravity of the traveling robot. The electronic control unit is configured to plan a motion of a movable part of the mobile unit and/or arm to the set target position. The electronic control unit is configured to, in the case where the traveling robot is close to the set target position, plan the motion of the movable part of the mobile unit and/or arm such that a limitation on a range of the center of gravity is relaxed as compared to a limitation on the range of the center of gravity in the case where the traveling robot is far from the set target position.

8 Claims, 9 Drawing Sheets

(56) References Cited

FOREIGN PATENT DOCUMENTS

| JP | 2012-236249 | 12/2012 |
|----|-------------|---------|
| JP | 2013-094934 | 5/2013  |

* cited by examiner

TRAVELING ROBOT, MOTION PLANNING METHOD FOR TRAVELING ROBOT, AND STORAGE MEDIUM STORING PROGRAM FOR TRAVELING ROBOT

INCORPORATION BY REFERENCE

The disclosure of Japanese Patent Application No. 2014-177931 filed on Sep. 2, 2014 including the specification, drawings and abstract is incorporated herein by reference in its entirety.

BACKGROUND OF THE INVENTION

1. Field of the Invention

The invention relates to a traveling robot that travels to a target position and then performs a task with the use of an arm, a motion planning method for the traveling robot, and a program for the traveling robot.

2. Description of Related Art

There is known a traveling robot including a mobile unit and an arm. The mobile unit includes wheels. The arm is supported on the mobile unit, and is coupled to the mobile unit so as to be relatively displaceable with respect to the mobile unit.

During traveling, the traveling robot plans the motion of each movable part such that the center of gravity is limited within a certain predetermined range. In this case, if the predetermined range is wide, there is a concern that the accuracy of positioning the traveling robot deteriorates because of, for example, a slip of the wheels of the mobile unit. On the other hand, if the predetermined range is narrow, the motion of the traveling robot is limited, so it becomes difficult to move the movable parts at high speed.

SUMMARY OF THE INVENTION

The invention provides a traveling robot that is able to achieve both the accuracy of positioning the traveling robot and the mobility of the traveling robot, a motion planning method for the traveling robot, and a non-transitory computer-readable storage medium storing a program for the traveling robot.

A first aspect of the invention provides a traveling robot. The traveling robot includes a mobile unit, an arm and an electronic control unit. The mobile unit includes wheels. The arm is supported on the mobile unit and coupled to the mobile unit so as to be relatively displaceable with respect to the mobile unit. The electronic control unit is configured to set a target position to which the traveling robot intends to travel. The electronic control unit is configured to calculate a center of gravity of the traveling robot. The electronic control unit is configured to plan a motion of a movable part of the mobile unit and/or arm to the set target position. The electronic control unit is configured to, in the case where the traveling robot is close to the set target position, plan the motion of the movable part of the mobile unit and/or arm such that a limitation on a range of the center of gravity is relaxed as compared to a limitation on the range of the center of gravity in the case where the traveling robot is far from the set target position. In the above aspect, the electronic control unit may be configured to plan the motion of each movable part of the traveling robot by limiting the calculated center of gravity within a predetermined range, and the electronic control unit may be configured to, when a position of the traveling robot falls within a predetermined distance from the set target position, remove the predetermined range within which the center of gravity is limited and then plan the motion of the movable part of the mobile unit and/or arm. In the above aspect, the electronic control unit may be configured to plan the motion of the movable part of the mobile unit and/or arm by limiting the calculated center of gravity within a predetermined range, and the electronic control unit may be configured to change the predetermined range in response to a distance between a position of the traveling robot and the set target position. In the above aspect, the electronic control unit may be configured to increase the predetermined range as the position of the traveling robot gets closer to the set target position. In the above aspect, the electronic control unit may be configured to plan a motion that is achieved by cooperation between the movable part of the mobile unit and the movable part of the arm. In the above aspect, the arm may include a holding unit for holding an operation object, and the electronic control unit may be configured to, when the holding unit of the arm falls within a predetermined distance from the set target position, remove the predetermined range within which the center of gravity is limited and then plan the motion of the movable part of the mobile unit and/or arm. A second aspect of the invention provides a motion planning method for a traveling robot. The traveling robot includes a mobile unit, an arm and an electronic control unit. The mobile unit includes wheels. The arm is supported on the mobile unit and coupled to the mobile unit so as to be relatively displaceable with respect to the mobile unit. The motion planning method includes setting, by the electronic control unit, a target position to which the traveling robot intends to travel; calculating, by the electronic control unit, a center of gravity of the traveling robot; and, in the case where the traveling robot is close to the set target position, planning, by the electronic control unit, a motion of a movable part of the mobile unit and/or arm such that a limitation on a range of the center of gravity is relaxed as compared to a limitation on the range of the center of gravity in the case where the traveling robot is far from the set target position. A third aspect of the invention provides a non-transitory computer-readable storage medium storing a program for a traveling robot. The traveling robot includes a mobile unit, an arm and a computer. The mobile unit includes wheels. The arm is supported on the mobile unit and coupled to the mobile unit so as to be relatively displaceable with respect to the mobile unit. The program causes the computer to execute a process. The process includes setting a target position to which the traveling robot intends to travel; calculating a center of gravity of the traveling robot; and, in the case where the traveling robot is close to the set target position, planning a motion of a movable part of the mobile unit and/or arm such that a limitation on a range of the center of gravity is relaxed as compared to a limitation on the range of the center of gravity in the case where the traveling robot is far from the set target position.

According to the aspects of the invention, it is possible to provide a traveling robot that is able to achieve both the accuracy of positioning the traveling robot and the mobility of the traveling robot, a motion planning method for the traveling robot and a non-transitory computer-readable storage medium storing a program for the traveling robot.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
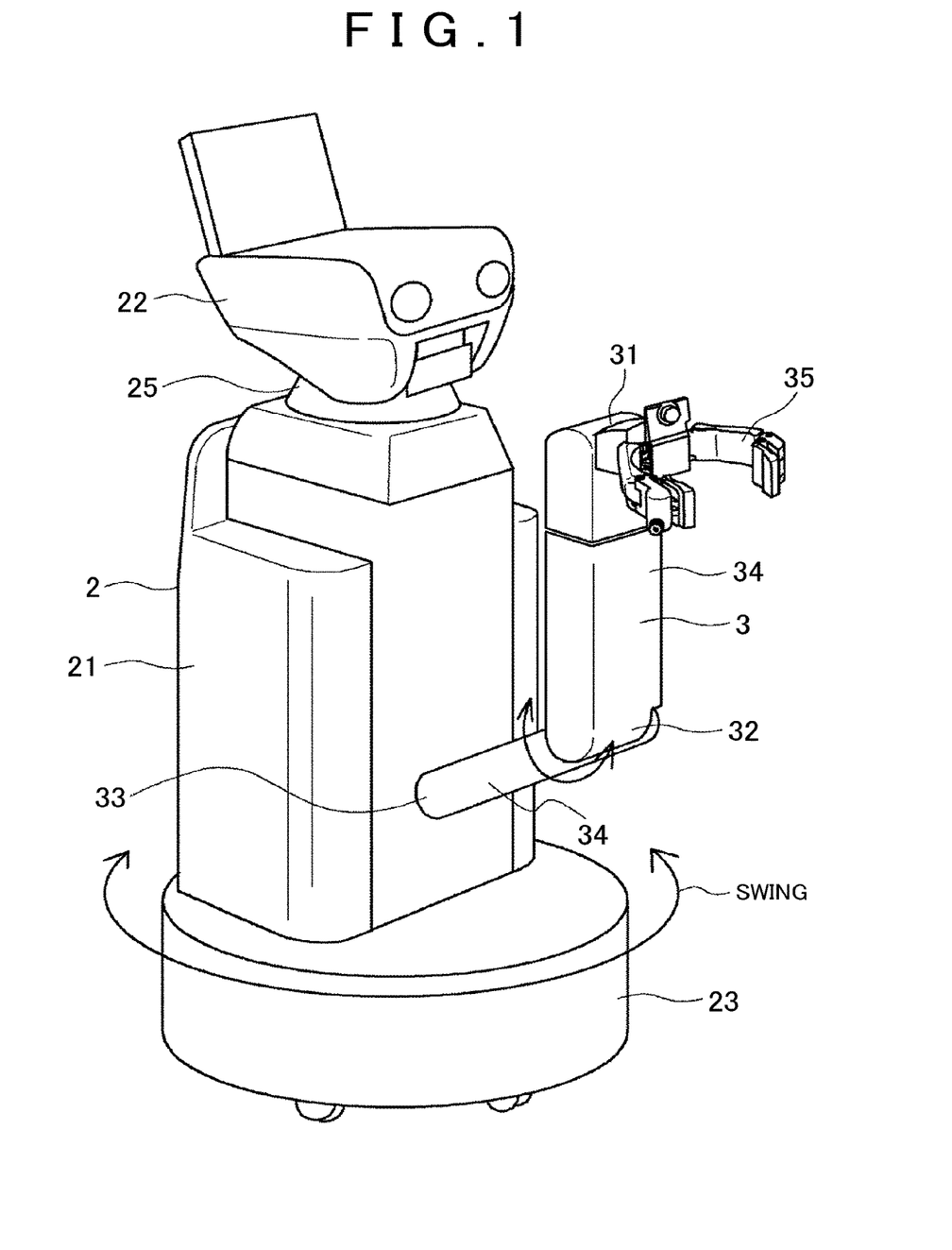
FIG. 1 is a perspective view that shows the schematic configuration of a traveling robot according to a first embodiment of the invention.
Figure 2:
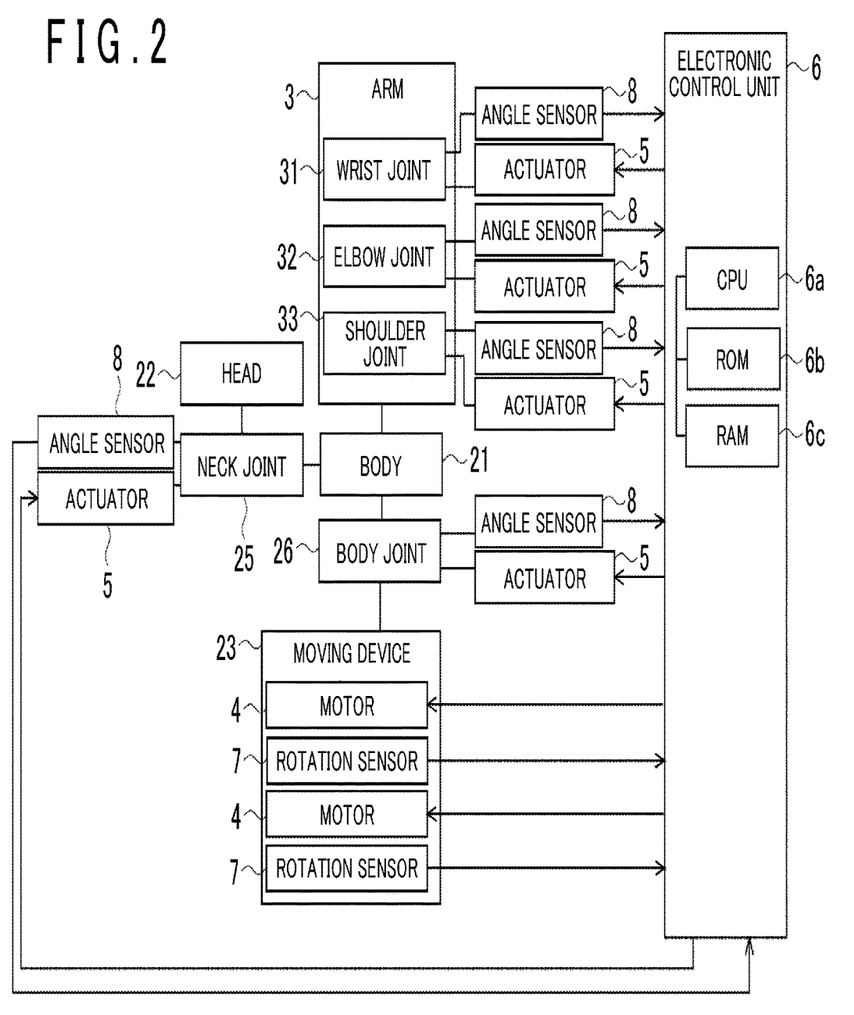
FIG. 2 is a block diagram that shows the schematic system configuration of the traveling robot according to the first embodiment of the invention.

Hereinafter, a first embodiment of the invention will be described with reference to the accompanying drawings. FIG. 1 is a perspective view that shows the schematic configuration of a traveling robot according to the first embodiment of the invention. FIG. 2 is a block diagram that shows the schematic system configuration of the traveling robot according to the first embodiment of the invention. The traveling robot 1 according to the first embodiment includes a mobile unit 2 and an arm 3 supported on the mobile unit 2.

The mobile unit 2 includes a body 21, a head 22 and a moving device 23. The arm 3 is coupled to the body 21 via a shoulder joint 33 so as to be relatively displaceable. The head 22 is provided on the body 21 via a neck joint 25 so as to be turnable.

Figure 5:
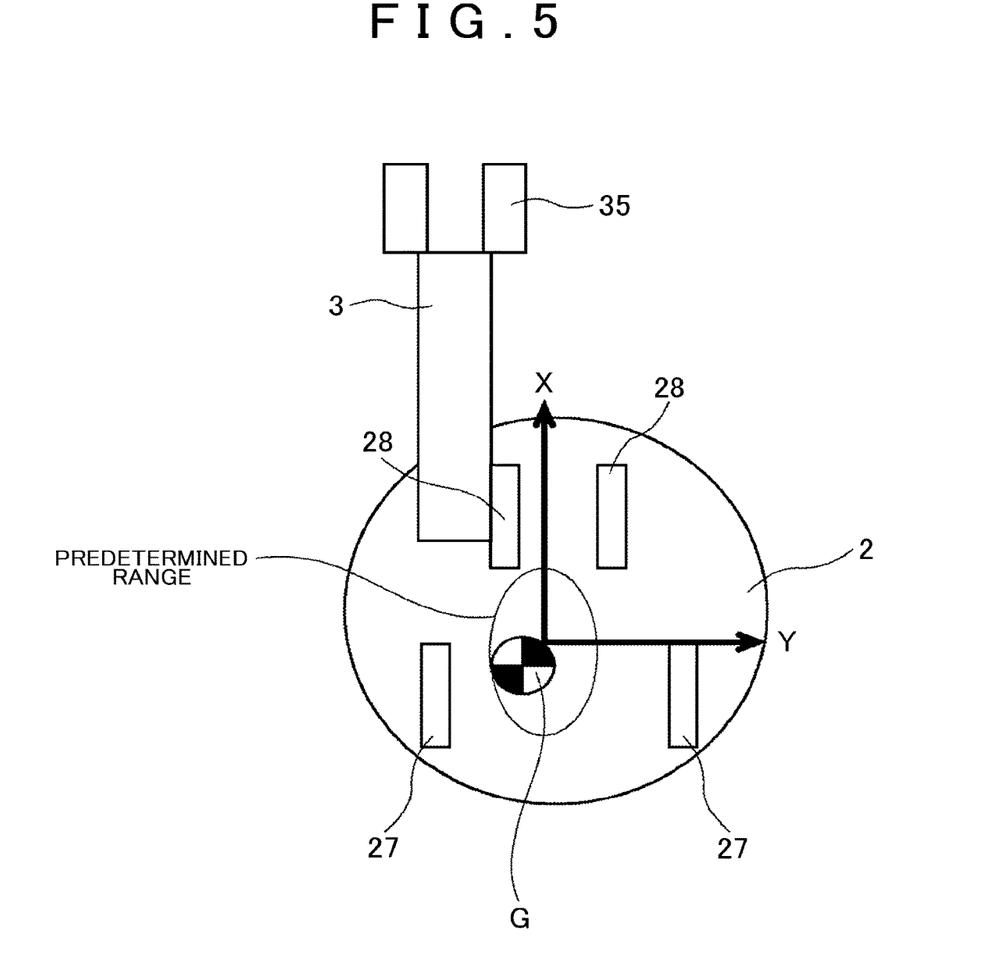
FIG. 5 is a view that shows an example of a predetermined range within which the center of gravity is constrained.

The moving device 23 is coupled to the lower portion of the body 21 via a body joint 26 so as to be swingable. The moving device 23 is, for example, an active caster omnidirectional cart (FIG. 5). The omnidirectional cart includes a pair of drive wheels 27 and a pair of laterally turnable driven wheels 28. The moving device 23 is able to, for example, arbitrarily move the traveling robot 1 forward or backward, swing the traveling robot 1 laterally, accelerate or decelerate the traveling robot 1 or stop the traveling robot 1, by rotationally driving the drive wheels 27.

The arm 3 is configured as, for example, an articulated arm. The arm 3 includes a plurality of links 34 and an end effector (including a hand mechanism, a suction mechanism, a hook mechanism, and the like) 35. The plurality of links 34 are coupled to each other via joints, such as a wrist joint 31, an elbow joint 32 and the shoulder joint 33. The end effector 35 is coupled to the distal end of the links 34, and holds, sucks or hooks an operation object. The configuration of the traveling robot 1 is just one example, and the configuration of the traveling robot 1 is not limited to this configuration.

The traveling robot 1 according to the first embodiment includes a pair of motors 4, a plurality of actuators 5, an electronic control unit 6, a plurality of rotation sensors 7 and a plurality of angle sensors 8. The pair of motors 4 drive the drive wheels 27. The plurality of actuators 5 include servomotors, or the like, that drive the joints.

The motors 4 are provided in the moving device 23 of the mobile unit 2. Each of the motors 4 drives a corresponding one of the drive wheels 27 in response to a control signal from the electronic control unit 6. The rotation sensors 7 are provided respectively in the drive wheels 27. Each of the rotation sensors 7 detects rotation information about a corresponding one of the drive wheels 27, and then outputs the rotation information to the electronic control unit 6. The electronic control unit 6 controls the motors 4 on the basis of the rotation information that is output from the rotation sensors 7.

The actuators 5 are respectively provided in the joints of the arm 3, body 21 of the mobile unit 2 and head 22. Each of the actuators 5 rotationally drives a corresponding one of the joints in response to a control signal from the electronic control unit 6. The angle sensors 8, such as potentiometers and encoders, are respectively provided in the joints. Each of the angle sensors 8 detects rotation angle information of a corresponding one of the joints. Each of the angle sensors 8 detects the rotation angle information of a corresponding one of the joints, and then outputs the rotation angle information to the electronic control unit 6. The electronic control unit 6 executes feedback control, or the like, on the actuators 5 of the joints on the basis of the corresponding pieces of rotation angle information, which are output from the angle sensors 8.

Figure 3:
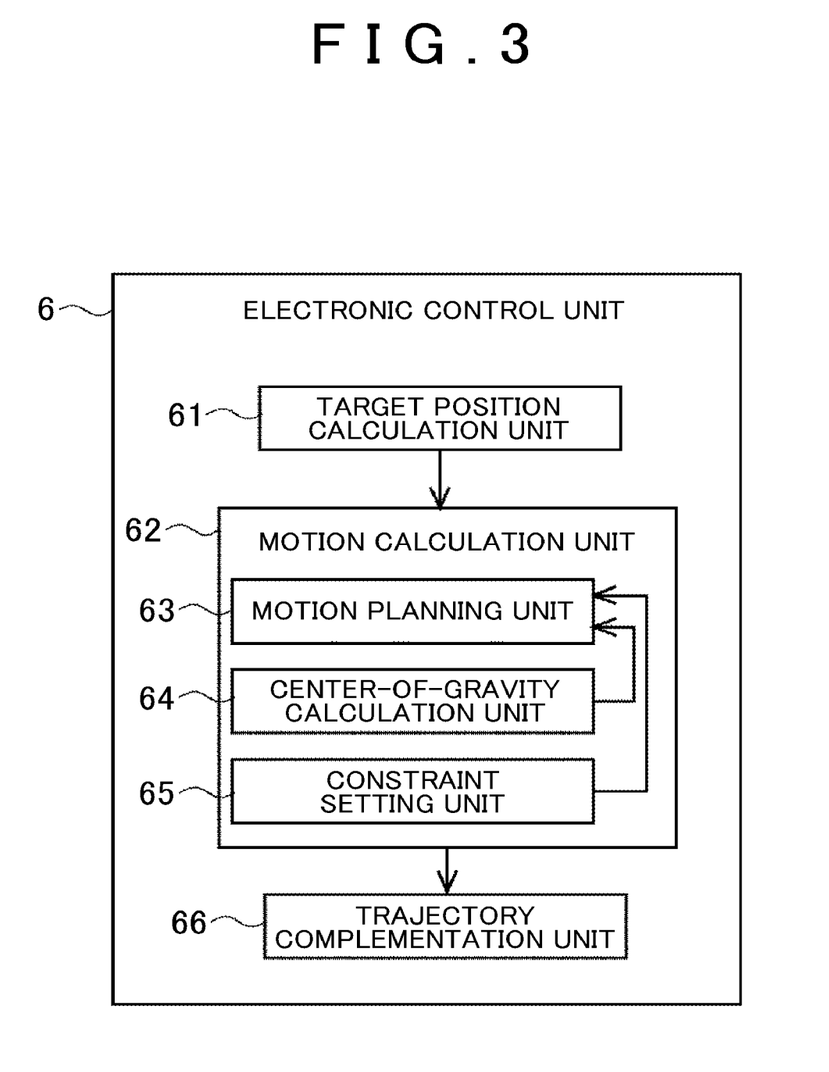
FIG. 3 is a block diagram that shows the schematic system configuration of an electronic control unit according to the first embodiment of the invention.

FIG. 3 is a block diagram that shows the schematic system configuration of the electronic control unit according to the first embodiment of the invention. The electronic control unit 6 according to the first embodiment includes a target position calculation unit 61, a motion calculation unit 62 and a trajectory complementation unit 66.

The hardware configuration of the electronic control unit 6 mainly includes, for example, a microcomputer formed of a central processing unit (CPU) 6a, a read only memory (ROM) 6b, a random access memory (RAM) 6c, and the like. The CPU 6a executes control processing, arithmetic processing, and the like. The ROM 6b stores control programs, arithmetic programs, and the like, that are executed by the CPU 6a. The RAM 6c stores processing data, and the like.

The target position calculation unit 61 calculates the initial position and orientation (hereinafter, referred to as initial position) of the traveling robot 1 and the terminal position and orientation (which are an example of the target position, and, hereinafter, referred to as terminal position) in accordance with operation information set by a user. The terminal position includes the position and orientation of the end effector 35, in which the traveling robot 1 performs a task on an operation object.

Figure 4:
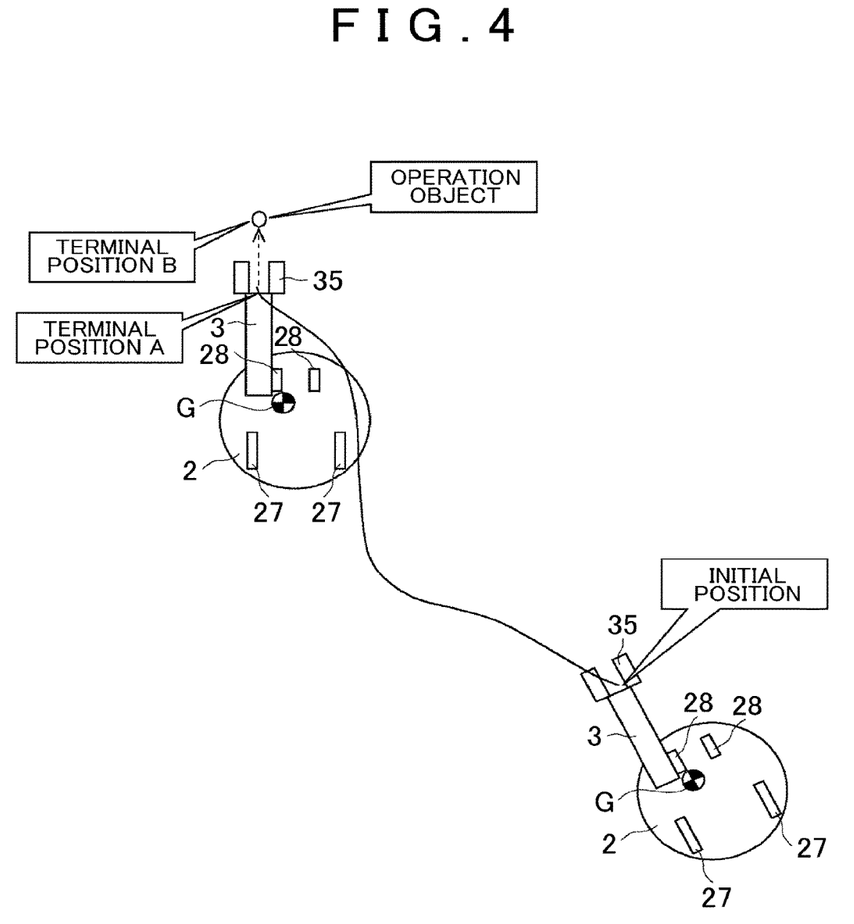
FIG. 4 is a view that shows an example of movement of the traveling robot.

The terminal position can take a different value depending on, for example, the shape or characteristic of the operation object, purpose, a task to be performed, or the like. In the first embodiment, the target position calculation unit 61, for example, calculates an initial position and a terminal position on the assumption of a collecting task of the traveling robot 1. As shown in FIG. 4, the target position calculation unit 61 calculates a joint trajectory that indicates the trajectory of each joint during times that the traveling robot 1 moves from the initial position to a terminal position A at which the traveling robot 1 is sufficiently close to the operation object and then moves from the terminal position A to a holding position (terminal position B). The target position calculation unit 61, for example, calculates joint trajectories without any constraint on the hand (end effector) orientation from the initial position to the terminal position A. On the other hand, the target position calculation unit 61 calculates joint trajectories with a constraint on the hand orientation from the terminal position A to the terminal position B.

In the above one example, the traveling robot 1 performs the collecting task. However, not limited to this configuration, for example, the traveling robot 1 is able to perform any task that requires positioning of the hand, such as a task of placing an object and a task of pushing an object. The target position calculation unit 61 outputs the calculated initial position and terminal position to the motion calculation unit 62.

The motion calculation unit 62 plans the motion of each joint off-line by searching for a joint trajectory of each joint in a joint space of the traveling robot 1 in consideration of various constraints. The joint space of the traveling robot 1 connects the initial position and the terminal position, calculated by the target position calculation unit 61. The motion calculation unit 62, for example, plans a motion that is achieved by cooperation among the joints of the mobile unit 2 and arm 3. The motion calculation unit 62 includes a motion planning unit 63, a center-of-gravity calculation unit 64 and a constraint setting unit 65.

The constraint setting unit 65 sets various constraints, such as the interference of the traveling robot 1 with an environment, or the like, the movable limit of the joint angle of each joint of the traveling robot 1 and the center of gravity of the traveling robot 1.

The motion planning unit 63, for example, plans the joint trajectory of each joint by searching for a node ($q_{new}$) using a sampling-based search, such as rapidly-exploring random tree (RRT), A*(A-star) and Dijkstra method, or nonlinear programming.

The motion planning unit 63, for example, makes the above-described node search while determining whether the various constraints set by the constraint setting unit 65 are satisfied. The motion planning unit 63 ends the node search when a node sufficiently close to the terminal position is obtained.

The motion planning unit 63 makes the node search in a joint angle space on the basis of the interference constraint set by the constraint setting unit 65. Therefore, the motion planning unit 63 obtains a group of nodes that do not interfere with the operation object, the environment or itself by sequentially using forward kinematics calculation.

The center-of-gravity calculation unit 64 calculates the center of gravity of the traveling robot 1 on the basis of the node ($q_{new}$) found by the motion planning unit 63. The center-of-gravity calculation unit 64, for example, calculates the center of gravity of the traveling robot 1 on the basis of the node ($q_{new}$) found by the motion planning unit 63, the mass and geometric structure of the links 34 of the arm 3, the mass of an object that is held by the end effector 35, the current orientation (rotation angle) of each joint, and the like. The center-of-gravity calculation unit 64 outputs the calculated center of gravity of the traveling robot 1 to the motion planning unit 63.

Incidentally, when a traveling robot including a mobile unit with drive wheels and an arm coupled to the mobile unit performs a manipulation task, such as holding an object, the accuracy of the position of the mobile unit is considerably important. However, in an existing traveling robot, there is an error in the accuracy of the position of the traveling robot due to a slip of the drive wheels of the mobile unit or a load imbalance between the drive wheels. Particularly, when the mobile unit moves a long distance, such an error accumulates and increases. Furthermore, the center of gravity of the traveling robot changes depending on the orientation of the arm or the weight of a held object.

In contrast, in the traveling robot 1 according to the first embodiment, in the case where the traveling robot 1 is close to the terminal position set by the target position calculation unit 61, the motion of each movable part of the traveling robot 1 is planned such that a limitation on the range of the center of gravity is relaxed as compared to a limitation on the range of the center of gravity in the case where the traveling robot 1 is far from the terminal position.

Thus, before the traveling robot 1 is close to the terminal position, the center of gravity of the traveling robot 1 is limited as usual. For this reason, the traveling robot 1 is able to travel in a state where the above-described slip of the drive wheels 27 of the mobile unit 2, load imbalance between the drive wheels 27, and the like, are reduced. Therefore, it is possible to reduce an error in the accuracy of the position of the traveling robot 1, so it is possible to improve the accuracy of odometry.

On the other hand, when the traveling robot 1 is close to the terminal position, a limitation on the center of gravity is further relaxed. For this reason, it is possible to search for a node with less constraints, and the motion of the traveling robot 1 is not so constrained. Therefore, there is a high possibility that the traveling robot 1 reaches the final orientation at high speed. Particularly, the hand position and orientation are more constrained near the terminal position, so it is possible to obtain solutions to satisfy the constraints on the hand position and orientation by relaxing the constraint on the center of gravity as described above.

For example, the motion planning unit 63 plans the motion of each joint of the traveling robot 1 by limiting the center of gravity, calculated by the center-of-gravity calculation unit 64, within a predetermined range. In addition, within a predetermined distance from the terminal position set by the target position calculation unit 61, the motion planning unit 63 removes the predetermined range within which the center of gravity is limited and then plans the motion of each joint of the traveling robot 1.

In this case, before the traveling robot 1 is close to the terminal position within the predetermined distance from the terminal position, the center of gravity of the traveling robot 1 is limited within the predetermined range. Thus, the traveling robot 1 is able to travel in a state where the above-described slip of the drive wheels 27 of the mobile unit 2, and the like, are reduced, so it is possible to improve the accuracy of the position of the traveling robot 1. On the other hand, when the traveling robot 1 is close to the terminal position within the predetermined distance from the terminal position, the predetermined range within which the center of gravity is limited is removed. Thus, it is possible to search for a node with less constraints, and the motion of the traveling robot 1 is not so constrained, so there is a high possibility that the traveling robot 1 reaches the final orientation at high speed.

In this way, the traveling robot 1 according to the first embodiment is able to improve the accuracy of its position by planning the motion of each joint, focusing on the center of gravity, until the traveling robot 1 is close to the operation object. The traveling robot 1 is able to operate the joints at high speed by planning the motion of each joint, focusing on mobility with less constraint on the center of gravity, when the traveling robot 1 is sufficiently close to the operation object. That is, it is possible to achieve both the accuracy of positioning the traveling robot 1 and the mobility of the traveling robot 1.

In the case of a task that requires large movement of the hand, such as opening a door, or a task for holding a distant operation object at high speed, the traveling robot 1 according to the first embodiment is able to hold the operation object while moving by actively utilizing a translation degree of freedom of the moving device 23. Thus, advantageous effects, such as compatibility with a large working area, improvement in working speed, and cost reduction resulting from a simplified degree of freedom of the arm, are expected.

The motion planning unit 63 determines whether the center of gravity of the traveling robot 1, calculated by the center-of-gravity calculation unit 64, falls within the predetermined range set by the constraint setting unit 65 and the constraint is satisfied. When the moving device 23 is configured as an active-caster omnidirectional cart as described above, the predetermined range forms an ellipse located near the center between the pair of drive wheels 27 as shown in FIG. 5.

The motion planning unit 63, for example, searches for a node while limiting the center of gravity ($p_{g1}$, $p_{g2}$) of the traveling robot 1, calculated by the center-of-gravity calculation unit 64, such that the center of gravity ($p_{g1}$, $p_{g2}$) satisfies the constraint of the following mathematical expression, set by the constraint setting unit 65, and falls within the predetermined range (the above-described ellipse).

$$(p_{g1}-\alpha)^2/a^2+(p_{g2}-\beta)^2/b^2<1$$

In the above mathematical expression, $p_{g1}$ and $p_{g2}$ are x and y coordinates of the center of gravity of the traveling robot 1 in a two-dimensional coordinate system having an origin at substantially the center of the traveling robot 1. a denotes the length of the major axis of the ellipse that represents the predetermined range, and b denotes the length of the minor axis of the ellipse. $\alpha$ and $\beta$ are values that can be arbitrarily taken by the mechanism of the traveling robot 1. As in the case of the first embodiment, in the case of the configuration that the drive wheels 27 of the moving device 23 are opposed, $\alpha$ is desirably set to a value close to a drive shaft, and $\beta$ is desirably set to near zero. The above-described predetermined range for the center of gravity is one example, and may be changed arbitrarily.

The above-described center of gravity is expressed in the two-dimensional coordinate system; instead, the center of gravity may be expressed in a three-dimensional coordinate system. In this case, a predetermined range that constrains the center of gravity forms, for example, an ellipsoid. X-axis and Y-axis components of the ellipsoid that represents the predetermined range may be, for example, set to stricter (smaller) values, and an Z-axis component is set to a looser (larger) value (or a large value without limitation).

The motion planning unit 63 determines whether the distance from the traveling robot 1 to the operation object is longer than a predetermined distance. The motion planning unit 63, for example, determines whether the distance from the end effector (holding unit) 35 of the arm 3 to the operation object is longer than the predetermined distance. When the motion planning unit 63 determines that the distance from (the distal end or center of gravity of) the end effector 35 to the operation object is shorter than or equal to the predetermined distance, the motion planning unit 63 removes the predetermined range within which the center of gravity is limited and then plans the motion of each joint. The predetermined range within which the center of gravity is limited is removed on the basis of the distance between the end effector 35 and the operation object, of which displacement easily occurs eventually, so it is possible to cause the end effector 35 to quickly reach the target position.

For example, when the following conditional expression is satisfied, the motion planning unit 63 searches for a node such that the constraint of the above-described mathematical expression is satisfied, and then plans the motion of each joint of the traveling robot 1. When the following conditional expression is satisfied, the distance from the traveling robot 1 to the terminal position is longer than a predetermined distance $\gamma$, and the traveling robot 1 is distant from the operation object.

$$|P_{obj}-P_{ee}|>\gamma$$

In the above mathematical expression, $P_{obj}$ denotes the position of the operation object in the coordinate system of the traveling robot 1. $P_{ee}$ denotes the position of the hand of the arm 3 in the coordinate system of the traveling robot 1. The predetermined distance $\gamma$ is, for example, set on the basis of an arm moving range, the details of a task, and the like, and is desirably set to a smaller value. When solutions that satisfy the above-described conditional expression are not obtained, the motion planning unit 63 may increase the predetermined distance $\gamma$ and then search for a node again.

On the other hand, when the above-described conditional expression is not satisfied, the motion planning unit 63 removes the constraint of the above-described mathematical expression and then searches for a node. The motion planning unit 63 may determine whether the distance from the traveling robot 1 to the terminal position is longer than the predetermined distance and then search for a node such that the constraint of the above-described mathematical expression is satisfied. The motion planning unit 63 outputs a group of the nodes found as described above to the trajectory complementation unit 66.

The trajectory complementation unit 66 converts the group of the nodes from the motion planning unit 63 to temporally-smooth joint trajectories. The electronic control unit 6 generates control signals for controlling the joints on the basis of the converted joint trajectories. The electronic control unit 6 controls the joints by outputting the generated control signals to the actuators 5 of the joints. The motion calculation unit 62 plans the motion of each joint off-line as described above; however, planning of the motion is not limited to this configuration. Instead, the motion calculation unit 62 may plan the motion of each joint on-line (during operation of the traveling robot 1).

Figure 6:
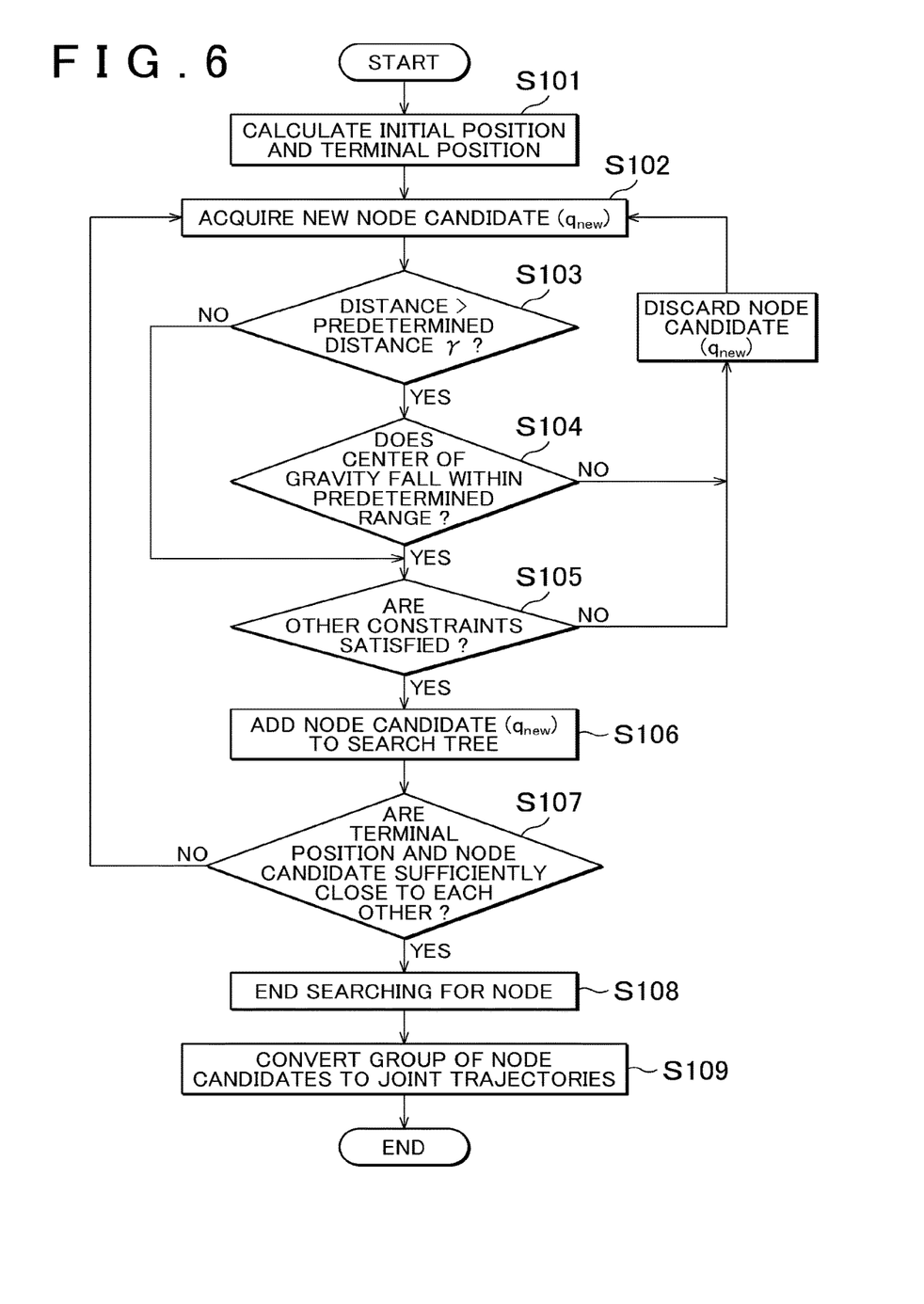
FIG. 6 is a flowchart that shows a motion planning method for the traveling robot according to the first embodiment of the invention.

FIG. 6 is a flowchart that shows a motion planning method for the traveling robot according to the first embodiment. The target position calculation unit 61 calculates the initial position and terminal position of the traveling robot 1 in accordance with operation information set by the user (step S101), and outputs the calculated initial position and terminal position to the motion calculation unit 62.

The motion planning unit 63 of the motion calculation unit 62 acquires a new node candidate ($q_{new}$) in the joint space of the traveling robot 1 by using, for example, a sampling-based search (step S102). The joint space of the traveling robot 1 connects the initial position and the terminal position, calculated by the target position calculation unit 61.

The motion planning unit 63 determines whether the distance between the hand of the traveling robot 1 at the acquired node candidate ($q_{new}$) and the operation object is longer than the predetermined distance $\gamma$ (step S103).

When the motion planning unit 63 determines that the distance between the hand of the traveling robot 1 at the acquired node candidate ($q_{new}$) and the operation object is longer than the predetermined distance γ (YES in step S103), the motion planning unit 63 determines whether the center of gravity of the traveling robot 1 falls within the predetermined range and the constraint is satisfied (step S104). On the other hand, when the motion planning unit 63 determines that the distance between the hand of the traveling robot 1 at the acquired node candidate ($q_{new}$) and the operation object is shorter than or equal to the predetermined distance γ (NO in step S103), the motion planning unit 63 proceeds to the process of step S105 (described later).

When the motion planning unit 63 determines that the center of gravity of the traveling robot 1 at the acquired node candidate ($q_{new}$) falls within the predetermined range and the constraint is satisfied (YES in step S104), the motion planning unit 63 determines whether the other constraints, such as the interference of the traveling robot 1 and the movable limit of the joint angle of each joint of the traveling robot 1, are satisfied (step S105). On the other hand, when the motion planning unit 63 determines that the center of gravity of the traveling robot 1 at the acquired node candidate ($q_{new}$) does not fall within the predetermined range and the constraint is not satisfied (NO in step S104), the motion planning unit 63 discards the node candidate ($q_{new}$), and returns to step S102.

When the motion planning unit 63 determines that the other constraints at the acquired node candidate ($q_{new}$) are satisfied (YES in step S105), the motion planning unit 63 adds the node candidate ($q_{new}$) to a search tree (step S106). On the other hand, when the motion planning unit 63 determines that the other constraints at the acquired node candidate ($q_{new}$) are not satisfied (NO in step S105), the motion planning unit 63 discards the node candidate ($q_{new}$), and returns to step S102.

The motion planning unit 63 determines whether the terminal position, calculated by the target position calculation unit 61, and the node candidate ($q_{new}$) are sufficiently close to each other (step S107). When the motion planning unit 63 determines that the terminal position and the node candidate ($q_{new}$) are sufficiently close to each other (YES in step S107), the motion planning unit 63 ends searching for a node, and outputs a group of the obtained node candidates to the trajectory complementation unit 66 (step S108). On the other hand, when the motion planning unit 63 determines that the terminal position and the node candidate ($q_{new}$) are not sufficiently close to each other (NO in step S107), the motion planning unit 63 returns to step S102. The trajectory complementation unit 66 converts the group of the node candidates from the motion planning unit 63 to a temporally-smooth joint trajectory of each joint (step S109).

In the traveling robot 1 according to the first embodiment, in the case where the traveling robot 1 is close to the terminal position set by the target position calculation unit 61, the motion of each movable part of the traveling robot 1 is planned such that a limitation on the range of the center of gravity is relaxed as compared to a limitation on the range of the center of gravity in the case where the traveling robot 1 is far from the terminal position. Thus, the traveling robot 1 is able to improve the accuracy of its position by planning the motion of each movable part, focusing on the center of gravity, before the traveling robot 1 is close to the target position. The traveling robot 1 is able to operate the movable parts at high speed by planning the motion of each movable part, focusing on mobility with less constraint on the center of gravity, when the traveling robot 1 is sufficiently close to the operation object. That is, it is possible to achieve both the accuracy of positioning the traveling robot 1 and the mobility of the traveling robot 1.

The feature of a motion planning unit according to a second embodiment of the invention is to explicitly bring a node candidate ($q_{new}$) close to a node at which the center of gravity of the traveling robot 1 satisfies the constraint, by mapping. Thus, it is possible to search for a node at high speed.

Figure 7:
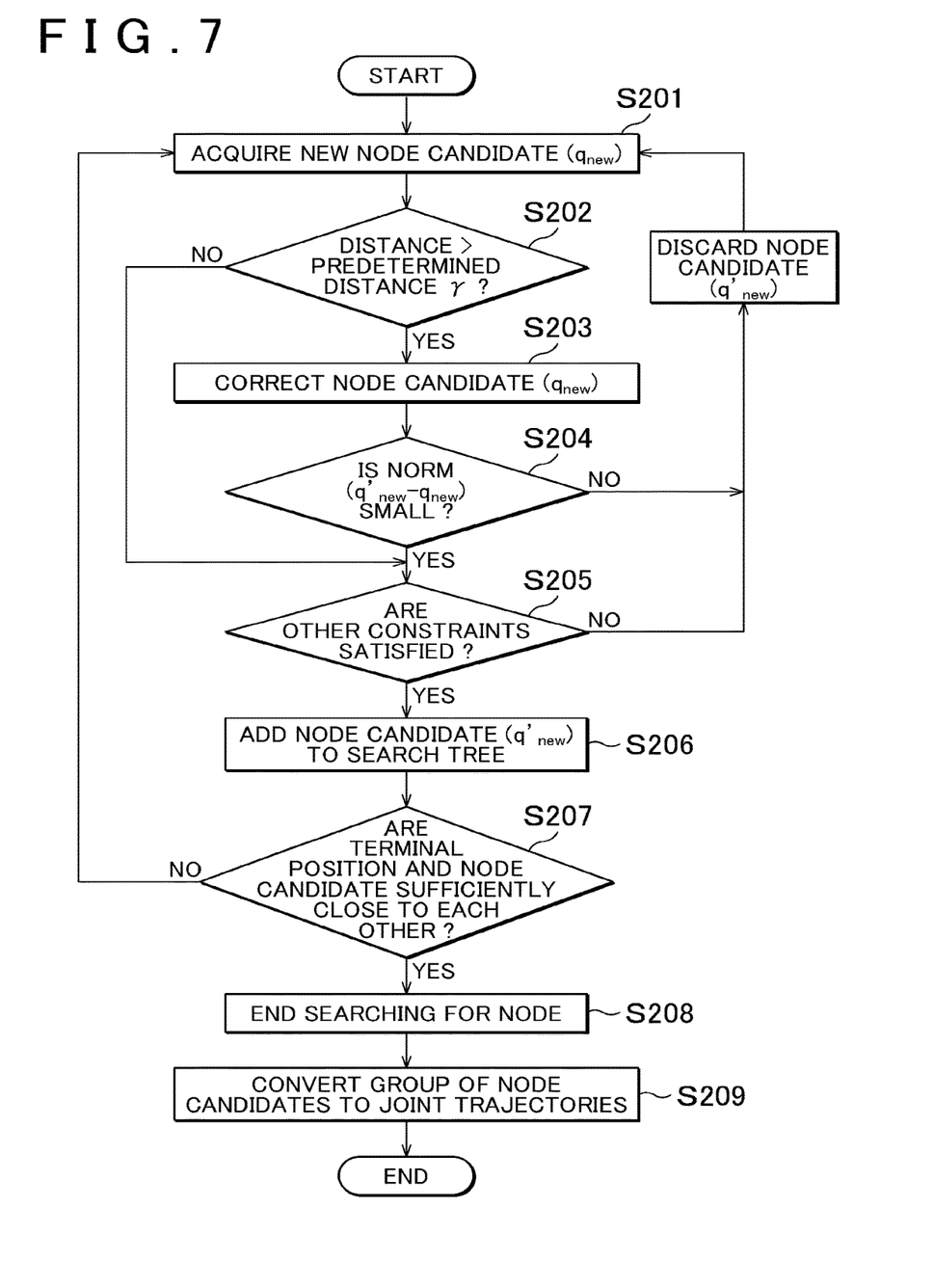
FIG. 7 is a flowchart that shows a node searching method according to a second embodiment of the invention.

FIG. 7 is a flowchart that shows a node searching method according to the second embodiment. The motion planning unit 63 of the motion calculation unit 62 acquires a new node candidate ($q_{new}$) in the joint space of the traveling robot 1 by using, for example, a sampling-based search (step S201). The joint space of the traveling robot 1 connects the initial position and the terminal position, calculated by the target position calculation unit 61.

The motion planning unit 63 determines whether the distance between the hand of the traveling robot 1 at the acquired node candidate ($q_{new}$) and the operation object is longer than the predetermined distance γ (step S202).

When the motion planning unit 63 determines that the distance between the hand of the traveling robot 1 at the acquired node candidate ($q_{new}$) and the operation object is longer than the predetermined distance γ (YES in step S202), the motion planning unit 63 corrects the node candidate, and brings the node candidate close to a node at which the center of gravity of the traveling robot 1 satisfies the constraint. The constraint on the center of gravity $P_g(q)$ of the traveling robot 1 is defined by the following mathematical expression.

$$P_{gmin} < P_g(q) < P_{gmax}$$

In the above-described constraint expression, $P_{gmin}$, $P_g(q)$ and $P_{gmax}$ each are a three-dimensional vector, and the ith element thereof is denoted by $P_{gi}$. Where $\Delta x = (\Delta x1, \Delta x2, \Delta x3)$, definition is made by the following mathematical expression.

$$\Delta x_i = \begin{cases} p_{gi}(q_{new}) - p_{gimin}(p_{gi} < p_{gimin}) \\ p_{gi}(q_{new}) - p_{gimax}(p_{gi} > g_{gimax}) \\ 0(\text{else}) \end{cases}$$

On the other hand, the relation between the velocity of the center of gravity and the velocity of each joint axis is generally expressed by the following mathematical expression.

$$\dot{p}_g = J_g(q)\dot{q}$$

In the above mathematical expression, where $\Delta q = J_g^+ \Delta x$ ($J_g^+$ is the pseudo inverse matrix of $J_g$), the following mathematical expression is derived.

$$\Delta q = J_g(q_{new})^+ \Delta x$$

The motion planning unit 63 corrects the node candidate ($q_{new}$) to a node candidate ($q'_{new}$) by using the following mathematical expression (step S203). Thus, it is possible to explicitly bring the node ($q_{new}$) close to a node at which the center of gravity of the traveling robot 1 satisfies the constraint.

$$q'_{new} = q_{new} - \Delta q$$

The motion planning unit 63 determines whether the norm ($q'_{new} - q_{new}$) is smaller than or equal to a predetermined value and is small (step S204). When the motion planning unit 63 determines that the norm ($q'_{new}$-$q_{new}$) is small (YES in step S204), the motion planning unit 63 determines that the center of gravity $P_g(q)$ of the traveling robot 1 at the node candidate ($q'_{new}$) satisfies the constraint expression. After that, the motion planning unit 63 determines whether the other constraints, such as the interference of the traveling robot 1 and the movable limit of the joint angle of each joint of the traveling robot 1, are satisfied (step S205). On the other hand, when the motion planning unit 63 determines that the norm ($q'_{new}$-$q_{new}$) is not small (NO in step S204), the motion planning unit 63 discards the node candidate ($q'_{new}$), and returns to step S201.

When the motion planning unit 63 determines that the other constraints are satisfied at the node candidate ($q'_{new}$) (YES in step S205), the motion planning unit 63 adds the node candidate ($q'_{new}$) to a search tree (step S206). On the other hand, when the motion planning unit 63 determines that the other constraints are not satisfied (NO in step S205), the motion planning unit 63 discards the node candidate ($q'_{new}$), and returns to step S201.

The motion planning unit 63 determines whether the terminal position, calculated by the target position calculation unit 61, and the node candidate ($q'_{new}$) are sufficiently close to each other (step S207). When the motion planning unit 63 determines that terminal position and the node candidate ($q'_{new}$) are sufficiently close to each other (YES in step S207), the motion planning unit 63 ends searching for a node, and outputs a group of the obtained node candidates to the trajectory complementation unit 66 (step S208). On the other hand, when the motion planning unit 63 determines that the terminal position and the node candidate ($q'_{new}$) are not sufficiently close to each other (NO in step S207), the motion planning unit 63 returns to step S201.

The trajectory complementation unit 66 converts the group of the node candidates from the motion planning unit 63 to a temporally-smooth joint trajectory of each joint (step S209).

According to the second embodiment, the node is explicitly brought close to a node at which the center of gravity of the traveling robot 1 satisfies the constraint, so it is possible to search for a node at higher speed, and it is possible to increase the processing speed.

The invention is not limited to the above-described embodiments. The above-described embodiments may be modified as needed without departing from the spirit of the invention.

In the above-described embodiments, within the predetermined distance from the terminal position set by the target position calculation unit 61, the motion planning unit 63 removes the predetermined range within which the center of gravity is limited and then plans the motion of each joint of the traveling robot 1; however, planning of the motion of each joint is not limited to this configuration. The motion planning unit 63 may continuously or stepwise change the predetermined range of the center of gravity in response to the distance between the position of the traveling robot 1 and the terminal position set by the target position calculation unit 61. For example, the motion planning unit 63 may relax limiting of the center of gravity within the predetermined range by continuously or stepwise increasing the predetermined range of the center of gravity as the position of the traveling robot 1 gets closer to the terminal position set by the target position calculation unit 61. In this case, the motion planning unit 63 may continuously or stepwise change the predetermined range of the center of gravity by using a function or table that represents the relation between the range of the center of gravity and the distance between the position of the traveling robot 1 and the terminal position.

In addition, the motion planning unit 63 may continuously or stepwise change the predetermined range of the center of gravity in response to the distance between the position of the traveling robot 1 and the terminal position set by the target position calculation unit 61, and, within the predetermined distance from the terminal position set by the target position calculation unit 61, the motion planning unit 63 may remove the predetermined range within which the center of gravity is limited and then plan the motion of each joint of the traveling robot 1. For example, the motion planning unit 63 may increase the predetermined range of the center of gravity as the position of the traveling robot 1 gets closer to the terminal position set by the target position calculation unit 61, and, within the predetermined distance from the terminal position set by the target position calculation unit 61, the motion planning unit 63 may remove the predetermined range within which the center of gravity is limited and then plan the motion of each joint of the traveling robot 1.

Figure 8:
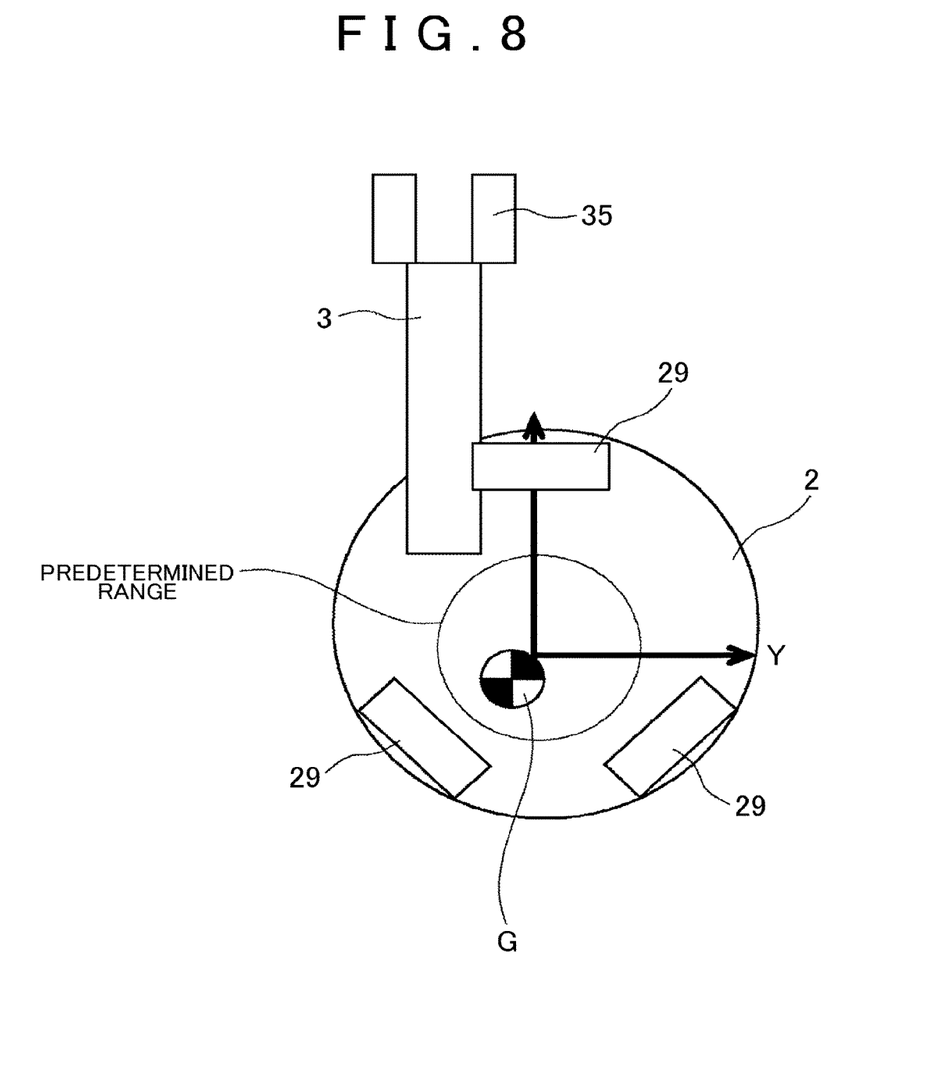
FIG. 8 is a view that shows a predetermined range of the center of gravity of a structure including omniwheels.

In the above-described embodiments, the moving device 23 is configured as an active-caster omnidirectional cart including the pair of drive wheels 27 and the pair of driven wheels 28; however, the moving device 23 is not limited to this configuration. For example, the moving device may be an active-caster omnidirectional cart including a pair of drive wheels and a single driven wheel or including four laterally-turnable drive wheels. In addition, the moving device may have a structure (FIG. 8) including three omni-wheels 29. In this case, the predetermined range that constrains the center of gravity is a circle having the center at the center point among the three wheels.

Figure 9:
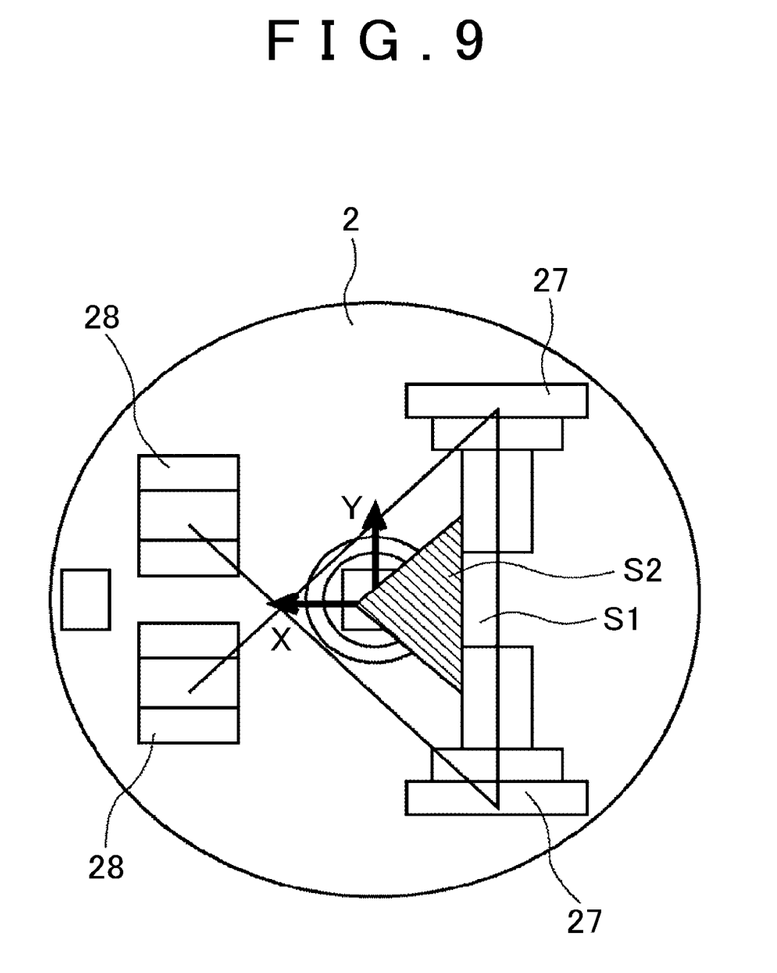
FIG. 9 is a view that shows a method of setting the predetermined range within which the center of gravity is constrained.

In addition, the predetermined range that constrains the center of gravity may be, for example, a triangle or a trapezoid or may be set as any polygon. For example, a load that is required of the pair of drive wheels 27 is calculated. A group of the centers of gravity at which the calculated load that is required of the drive wheels 27 is obtained is obtained by, for example, setting a stiffness to each drive wheel 27 and then obtaining an equilibrium of force among the driven wheels 28 and the drive wheels 27 (FIG. 9). A predetermined range S2 of the center of gravity is obtained by subtracting a margin S1 from the obtained group of the centers of gravity. The margin S1 is set for absorbing dynamic elements (the acceleration, centrifugal force, and the like, of the moving device 23), uneven spots of a floor surface and deviations among the wheels, and the like.

In the traveling robot 1, a slip, or the like, of each drive wheel more easily occurs and an error more easily occurs in the accuracy of the position during turning as compared to during traveling straight ahead. Therefore, for example, limiting the center of gravity within the predetermined range may be more tightened (the predetermined range may be reduced) at the time when the traveling robot 1 makes a turn. Thus, it is possible to further improve the accuracy of the position of the traveling robot 1 in consideration of the traveling state of the traveling robot 1.

There is a case where a slip of the drive wheels 27 and driven wheels 28 of the traveling robot 1 easily occurs in a certain direction because of the state (balance, structure, and the like) of the traveling robot 1 or a traveling environment, such as the state (gradient, uneven spots, and the like) of a running road surface and side wind. In this case, limiting the center of gravity within the predetermined range may be more tightened in the direction in which a slip easily occurs.

Thus, it is possible to further improve the accuracy of the position of the traveling robot 1 in consideration of the state of the traveling robot 1 and the traveling environment.

The invention may be implemented by, for example, causing the CPU 6a to execute a computer program of the processes shown in FIG. 6 and FIG. 7.

The program may be stored in various types of non-transitory computer readable media, and supplied to a computer. The non-transitory computer readable media include various types of tangible storage media. Examples of the non-transitory computer readable media include a magnetic recording medium (such as a flexible disk, a magnetic tape and a hard disk drive), a magneto-optical recording medium (such as a magneto-optical disk), a CD-ROM (read only memory), a CD-R, a CD-R/W, a semiconductor memory (such as a mask ROM, a programmable ROM (PROM), an erasable PROM (EPROM), a flash ROM, a random access memory (RAM)).

The program may be supplied to a computer via various types of transitory computer-readable media. Examples of the transitory computer-readable media include an electrical signal, an optical signal and an electromagnetic wave. The transitory computer-readable media are able to supply the program to a computer via a wired communication path, such as an electric wire and an optical fiber, or a wireless communication path.

What is claimed is:

1. A traveling robot comprising:
a mobile unit including wheels;
an arm supported on the mobile unit and coupled to the mobile unit so as to be relatively displaceable with respect to the mobile unit; and
an electronic control unit configured to
(i) set a target position to which the traveling robot intends to travel,
(ii) calculate a center of gravity of the traveling robot, and
(iii) plan a motion of a movable part of the mobile unit and/or arm to the set target position, the electronic control unit being configured to, in the case where the traveling robot is close to the set target position, plan the motion of the movable part of the mobile unit and/or arm such that a limitation on a range of the center of gravity is relaxed as compared to a limitation on the range of the center of gravity in the case where the traveling robot is far from the set target position, wherein
the electronic control unit is configured to plan the motion of the movable part of the mobile unit and/or the arm by limiting the calculated center of gravity within a predetermined range, and
the electronic control unit is configured to increase or remove the predetermined range in response to a distance between a position of the traveling robot and the set target position being less than or equal to a non-zero predetermined distance.

2. The traveling robot according to claim 1, wherein
the electronic control unit is configured to, when a position of the traveling robot falls within the predetermined distance from the set target position, remove the predetermined range within which the center of gravity is limited and then plan the motion of the movable part of the mobile unit and/or arm.

3. The traveling robot according to claim 1, wherein
the electronic control unit is configured to increase the predetermined range as the position of the traveling robot gets closer to the set target position.

4. The traveling robot according to claim 1, wherein
the motion that the electronic control unit is configured to plan is achieved by cooperation between the movable part of the mobile unit and the movable part of the arm.

5. The traveling robot according to claim 2, wherein
the arm includes a holding unit for holding an operation object, and
the electronic control unit is configured to use the position of the holding unit of the arm as the position of the traveling robot.

6. The traveling robot according to claim 1, wherein
the position of the traveling robot is a distal end of the arm.

7. A motion planning method for a traveling robot, the traveling robot including a mobile unit, an arm and an electronic control unit, the mobile unit including wheels, the arm being supported on the mobile unit and coupled to the mobile unit so as to be relatively displaceable with respect to the mobile unit, the motion planning method comprising:
setting, by the electronic control unit, a target position to which the traveling robot intends to travel;
calculating, by the electronic control unit, a center of gravity of the traveling robot; and
in the case where the traveling robot is close to the set target position, planning, by the electronic control unit, a motion of a movable part of the mobile unit and/or arm such that a limitation on a range of the center of gravity is relaxed as compared to a limitation on the range of the center of gravity in the case where the traveling robot is far from the set target position, wherein
the electronic control unit plans the motion of the movable part of the mobile unit and/or the arm by limiting the calculated center of gravity within a predetermined range, and
the electronic control unit increases or removes the predetermined range in response to a distance between a position of the traveling robot and the set target position being less than or equal to a non-zero predetermined distance.

8. A non-transitory computer readable storage medium storing a program for a traveling robot including a mobile unit, an arm and a computer, the mobile unit including wheels, the arm being supported on the mobile unit and coupled to the mobile unit so as to be relatively displaceable with respect to the mobile unit, the program causing the computer to execute a process, the process comprising:
setting a target position to which the traveling robot intends to travel;
calculating a center of gravity of the traveling robot; and
in the case where the traveling robot is close to the set target position, planning a motion of a movable part of the mobile unit and/or arm such that a limitation on a range of the center of gravity is relaxed as compared to a limitation on the range of the center of gravity in the case where the traveling robot is far from the set target position, wherein
the motion of the movable part of the mobile unit and/or the arm is planned by limiting the calculated center of gravity within a predetermined range, and
the predetermined range in response to a distance is increased or removed between a position of the traveling robot and the set target position being less than or equal to a non-zero predetermined distance.

* * * * *